United States Patent
Leopold et al.

[19]

[11] Patent Number: 6,128,286

[45] Date of Patent: Oct. 3, 2000

[54] METHOD AND APPARATUS FOR USING THE SIDELOBE OF A LONG RANGE ANTENNA FOR A SHORT RANGE COMMUNICATION LINK

[75] Inventors: Raymond Joseph Leopold, Tempe; Keith Andrew Olds, Mesa; Bary Robert Bertiger, Scottsdale, all of Ariz.

[73] Assignee: Motorola, Inc., Schaumburg, Ill.

[21] Appl. No.: 08/758,335

[22] Filed: Dec. 3, 1996

[51] Int. Cl.[7] ............................................ H04B 7/185
[52] U.S. Cl. ........................ 370/316; 455/13.1; 375/308
[58] Field of Search ................................. 370/310, 315, 370/316, 317, 318, 319, 320, 321, 326, 328; 455/11.1, 12.1, 13.1, 13.2, 13.4; 375/308

[56] References Cited

U.S. PATENT DOCUMENTS

| | | | |
|---|---|---|---|
| 3,596,002 | 7/1971 | Ohnsorge et al. | 370/320 |
| 4,004,098 | 1/1977 | Shimasaki | 370/325 |
| 4,901,307 | 2/1990 | Gilhousen et al. | 370/320 |
| 5,363,368 | 11/1994 | Vatt et al. | 370/280 |
| 5,396,643 | 3/1995 | Frenzer et al. | 455/13.1 |
| 5,430,729 | 7/1995 | Rahnema | 370/409 |
| 5,490,076 | 2/1996 | Rawicz et al. | 455/98 |
| 5,506,781 | 4/1996 | Cummiskey et al. | 701/226 |

*Primary Examiner*—Ajit Patel
*Assistant Examiner*—Bob A. Phunkulh
*Attorney, Agent, or Firm*—Walter W. Nielsen; James E. Klekotka

[57] ABSTRACT

A communication satellite system (100) is established using one or more satellite constellations (110, 120). The two or more satellite groups (110, 120) are connected via long range crosslinks (145) which provide a communication path between the long range satellites (150, 170) in the two satellite groups (110, 120). Each satellite group (110, 120) comprises long range satellites (150, 170) and short range satellites (160, 180) which are interconnected using short range crosslinks (155, 175). A single antenna on each satellite provides both crosslinks. The long range crosslink (145) is established using the antenna's main beam and the short range crosslinks (155, 175) are established using the antenna's sidelobes.

24 Claims, 5 Drawing Sheets

METHOD AND APPARATUS FOR USING THE SIDELOBE OF A LONG RANGE ANTENNA FOR A SHORT RANGE COMMUNICATION LINK

FIELD OF THE INVENTION

The present invention pertains to communication systems and, more particularly, to apparatus and methods for transmitting and receiving signals between satellites in communication systems.

BACKGROUND OF THE INVENTION

International regulations govern the placement and station keeping for geosynchronous satellites. These regulations require the ground path of a geosynchronous satellite to intersect the equator only within a tolerance window, or "orbital slot", which is allocated to the satellite. Typically, each orbital slot is centered over a single longitude and is defined about the central position by ±0.05 degrees to ±0.1 degrees of longitude. Orbital slots currently are centered at every two degrees of longitude (e.g., 180 slots exist around the earth). This separation helps to ensure that signals emitted from satellites located in adjacent orbital slots will not significantly interfere with each other.

The finite availability of orbital slots encourages satellite designers to design geosynchronous satellites having the largest possible data-carrying capacity. The capacity of a geosynchronous satellite is typically proportional to the size of the satellite and is limited by the state of current technology. Large, prior art geosynchronous satellites are expensive to build and place in orbit. Because of the expense, it is not typically feasible to frequently replace geosynchronous satellites which have too little traffic-carrying capacity due to inadequate size and/or outdated technology.

In some prior art systems, multiple geostationary satellites are placed within a single orbital slot in order to increase the traffic carrying capacity of the system within that slot. This is referred to as co-positioning or co-location. In other prior art systems, multiple geostationary satellites are placed in different orbital slots and interconnected using links between the satellites.

In designing better satellite communications systems, the designers must be primarily concerned about maintaining the link. In some cases, the link is between a satellite and a user, and in other cases, the links are between different satellites. This means that a link analysis must be performed. The radio frequency (RF) carrier-to-noise power ratio (C/N) at the receiving end depends on power delivered to the antenna, antenna gains, propagation losses, and effective noise temperatures of the receiving system.

The link equation can be written as $$C/N = EIRP(1/L)(G/T)(1/(k*B))$$

where EIRP=Effective Isotropically Radiated Power;

L=$[(4*\Pi*R)/(\lambda)]^2$ where R is the range from the transmitter to the receiver and $\lambda$ is the RF wavelength;

G/T=figure of merit;

k=Boltzmann's constant; and

B=noise bandwidth of the receiver.

In the above equation, L is the ratio of the spreading area to the effective area of an isotropic antenna, and G/T is the ratio of the gain of the receiver's antenna to the noise temperature of the receiver's antenna.

Every communication system has a link budget associated with it. The link budget is a necessary prerequisite for the establishment of any communication channel whether that channel is a terrestrial based channel, a terrestrial to space channel or a space-based channel.

The link budget is used to determine if the link will "close". A primary concern is whether the required carrier-to-noise power ratio (C/N) can be achieved.

In prior art systems, designers have viewed antennas as devices for a single function. This leads to satellite payloads which are heavier and more complex than they need to be.

What are needed are a method and apparatus which overcome these limitations and allow smaller and less costly satellites to be constructed.

BRIEF DESCRIPTION OF THE DRAWINGS

A more complete understanding of the present invention can be derived by referring to the detailed description and claims when considered in connection with the figures, wherein like reference numbers refer to similar items throughout the figures, and:

DETAILED DESCRIPTION OF A PREFERRED EMBODIMENT

Figure 1:
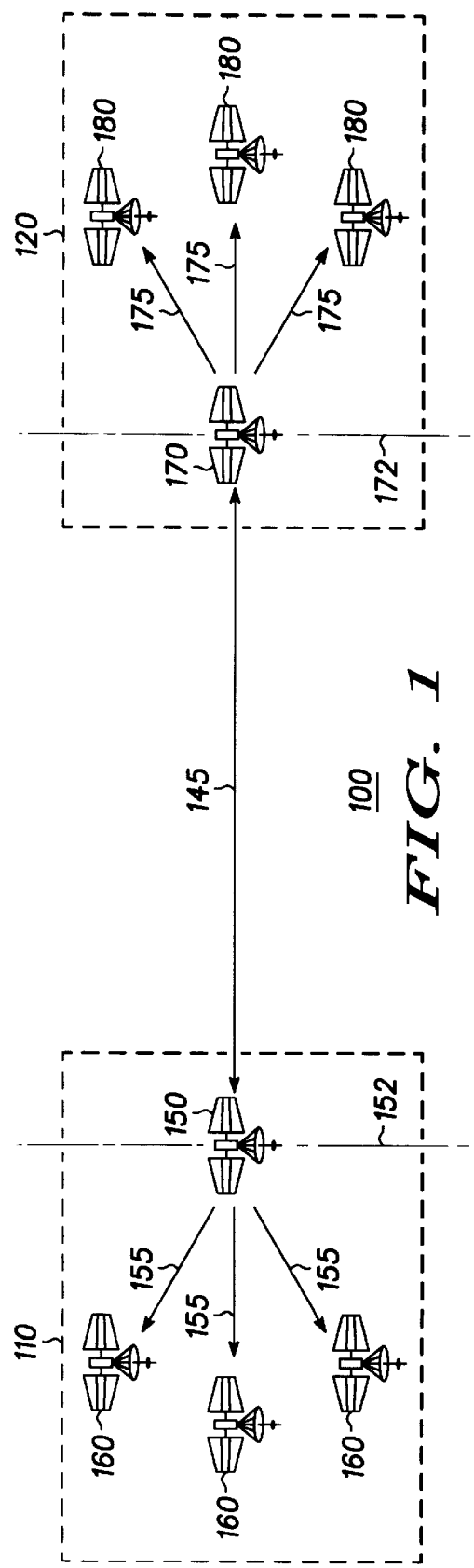
FIG. 1 shows a block diagram of a satellite communication system in which the space based communication links are provided by short range communication crosslinks and long range communication crosslinks, in accordance with a preferred embodiment of the present invention.

The present invention overcomes the aforementioned limitations of the prior art by using an improved transceiver design which uses various techniques to combine a long range signal and a short range signal into a single signal. This allows a single transceiver and antenna to transmit and receive both the long range signal and the short range signal. Prior art systems used separate and distinct transceivers for the long range signals and the short range signals.

The method and apparatus of the present invention are directed toward a satellite constellation that requires very long range inter-satellite links (ISLs) and very short range ISLs. For example, a global geosynchronous communication system can be envisioned in which two or more satellites are placed in a single orbital slot and then crosslinked to other satellites in different orbital slots separated by a significant orbital arc. An alternate embodiment of the present invention could use geosynchronous earth orbit (GEO) satellites and low earth orbit (LEO) satellites in a (GEO/LEO) hybrid system where ISLs are needed between satellites of the same constellation as well as between satellites of the different constellations. The method and apparatus of the present invention are designed to reduce the size, weight, power, and complexity of the transceiver hardware and antennas needed to support these multi-ISL systems.

In a satellite constellation that requires very long range ISLs and very short range ISLs, it is necessary to provide ISLs with very different link requirements. Long range ISLs require very high EIRP and G/T to ensure adequate communications performance. Long range links also require very accurate antenna beam pointing. Short range ISLs do not require especially high performance in any of these areas. Typically, two different ISL designs are used to serve these functions. The method and apparatus of the present invention remove much of the hardware and the antenna required for the short range ISL, by taking advantage of the presence of sidelobes on the long range ISL antenna.

The method and apparatus of the present invention involve combining the short range ISL into the long range ISL transceiver and radiating it and receiving it through the sidelobes of the long range ISL antenna. The short range ISL can use the long range ISL antenna because the long range ISL requires very high EIRP and G/T. Because of these requirements, a high gain antenna is used. For example, in the geostationary constellation design, a 60 gigahertz (GHz) long range ISL antenna has a gain of 58 decibels with respect to an omni value (dBi) in order to close the link at a range of 78000 kilometers (km). The short range ISL only requires a maximum range of 150 km, and usually the short range ISL requires much less. This provides a minimum of a 54 decibel (dB) range advantage between the long range and short range links. Thus, the short range ISL achieves the same link quality with 54 dB less EIRP and G/T than the long range ISL needs.

Unless the most stringent beam shaping techniques are applied to the long range antenna, forward hemisphere sidelobe suppression does not exceed 30 dB. In addition, the absolute sidelobe gain generally is never below −10 dBi at any angle except in very narrow nulls. In an alternate embodiment, the short range ISL could be designed for an antenna gain of 25 dBi or more which would result in a very stable configuration in which the sidelobe angle could be controlled. In other alternate embodiments, different gain values could be used. For example, a gain value of −10 dBi could be used. In a preferred embodiment, a short range antenna gain of 0 dB is adequate. This value is available over a large range of angles. In a preferred embodiment, the satellite constellation is designed to ensure that the satellites in the same slot do not fall into a sidelobe null of the long range antenna.

To overcome the problems of establishing a second distinct receiver and transmitter when sending short range data, the long range services are utilized. Using the long range services provides the convenience of not having to establish an independent or dedicated short range receiver and transmitter from source to destination to send short range data. Historically, long range data and short range data could not be mixed on the same channel. The method and apparatus of the present invention make this possible.

FIG. 1 shows a block diagram of a satellite communication system in which the space-based communication links are provided by short range communication crosslinks and long range communication crosslinks, in accordance with a preferred embodiment of the present invention. FIG. 1 shows two satellite groupings (110, 120). A first group 110 is shown containing four satellites. The number of satellites in this group 110 can vary from one to several depending on the system design. A second group 120 is shown also containing four satellites. The number of satellites in this group 120 can also vary from one to several satellites. In a preferred embodiment, the two groups represent two different constellations associated with two different orbital slots 152, 172.

Two different satellite types are identified in first group 110. A single long range satellite 150 is shown along with three short range satellites 160. The present invention does not require a single long range satellite or a specific number of short range satellites. Long range satellite 150 is the satellite in the first grouping which can be used to establish a long range link to the second satellite group. Short range satellites 160 in the first group are those satellites which can be used to establish short range links with a long range satellite within the group to which it belongs. Long range satellite 170 is the satellite in the second grouping which can be used to establish a long range link to the first satellite group. Short range satellites 180 in the second group are those satellites which can be used to establish short range links with a long range satellite within the second group. Those skilled in the art will recognize that many satellite groups 110, 120, any number of long range satellites 150, 170, any number of short range satellites 160, 180, any number of long range crosslinks 145 and any number of short range crosslinks 155, 175 are possible.

In a preferred embodiment of the present invention, crosslink 145, crosslink 155, and crosslink 175 utilize RF frequencies which accommodate substantially line-of-sight communication. Crosslink 145, crosslink 155, and crosslink 175 encompass a limited portion of the electromagnetic spectrum that can be divided into numerous channels. Crosslink 145, crosslink 155, and crosslink 175 can encompass Frequency Division Multiple Access (FDMA) and/or Time Division Multiple Access (TDMA) and/or Code Division Multiple Access (CDMA) communications or combinations thereof.

Crosslink 145 is shown as a bi-directional link. Crosslink 155 and crosslink 175 are shown as uni-directional links. Those skilled in the art will recognize that any of the crosslinks can be either uni-directional or bi-directional.

In a preferred embodiment, a satellite system 100 requires at least one long range inter-satellite link (ISL) and at least one short range ISL. At least one long range ISL is provided via long range crosslink 145 from a first satellite group 110 to a second satellite group 120. The long range crosslink 145 is provided by an RF signal means or a laser signal means. At least one short range ISL is provided via short range crosslinks 155, 175. Short range crosslinks 155 are shown between long range satellite 150 and short range satellites 160 in a first satellite group 110. Short range crosslinks 175 are shown between long range satellite 170 and short range satellites 180 in a second satellite group 120. Those skilled in the art will recognize that short range crosslink 155 could have characteristics similar to short range crosslink 175.

In a preferred embodiment, a satellite in a satellite system 100 can use a crosslink device for transmitting a first set of signals via long range crosslinks 145 to a first number of satellites which are located far from the satellite while using the same crosslink device for transmitting a second set of signals via short range crosslinks 155, 175 to a second number of satellites which are located near to the satellite. In this case, the first set of signals and the second set of signals are combined into a single transmitted signal. The crosslink device on the satellite can also be used for receiving a third set of signals from a third number of satellites via long range crosslinks 145. In addition, the crosslink device can be used to receive a fourth set of signals from a fourth number of satellites via short range crosslinks 155,175.

Figure 2:
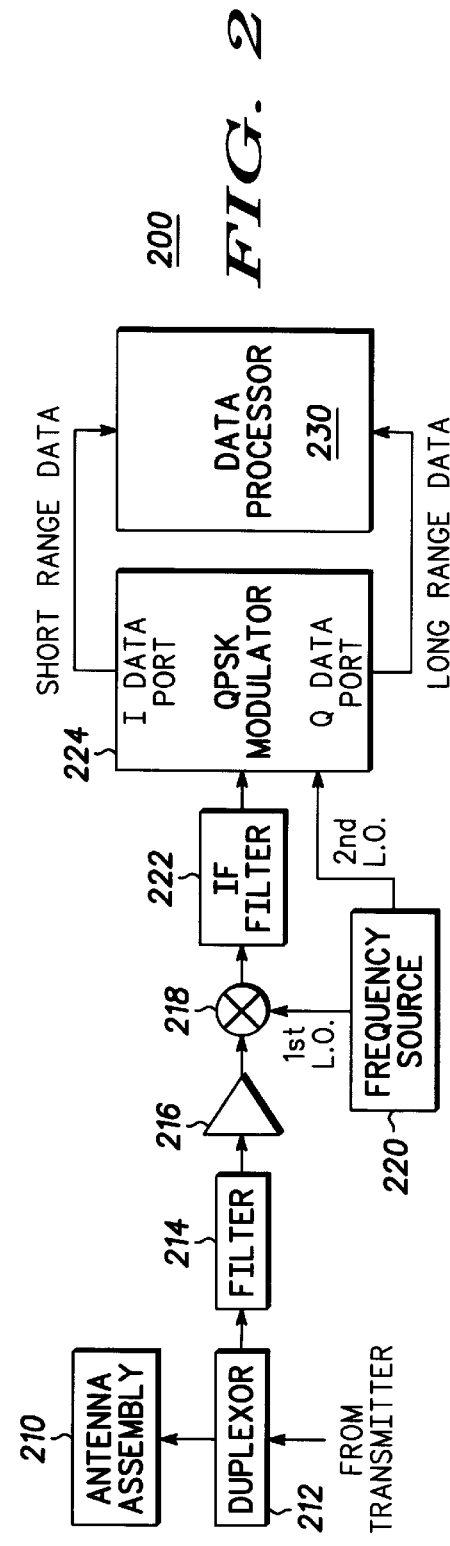
FIG. 2 shows a block diagram for a receiver desirably used in a preferred embodiment of the present invention.

FIG. 2 shows a block diagram for a receiver desirably used in a preferred embodiment of the present invention. Receiver 200 comprises antenna assembly 210, duplexor 212, filter 214, amplifier 216, down converter 218, frequency source 220, intermediate frequency (IF) filter 222, quadrature phase shift keyed (QPSK) demodulator 224, and data processor 230.

Antenna assembly 210 can be an RF communication device or a laser communication device. In a preferred embodiment, antenna assembly 210 is used to communicate with other satellites which can be located in the same group or located in a different group. It should be understood that while each receiver 200 is illustrated in FIG. 2 as having a single antenna assembly 210, each antenna assembly 210 can typically comprise several antennas, so that receiver 200 can communicate with more than one satellite at a time. Those skilled in the art will appreciate that instead of a bank of discrete, uni-directional antennas, antenna assembly 210 can be implemented as a single, phased-array antenna or a combination of uni-directional antennas and phased-array antennas.

Antenna assembly 210 is coupled to duplexor 212 which is used to combine the transmit and receive functions. Duplexor 212 is coupled to a filter 214. Filter 214 is used to bandlimit the received signal. Filter 214 is coupled to amplifier 216. Amplifier 216 provides the necessary amplification of the received signals. Amplifier 216 is coupled to down converter 218. Down converter 218 uses a first local oscillator (LO) to down convert the received signals so that demodulation can take place. Down converter 218 is coupled to frequency source 220 and to IF filter 222. Frequency source 220 provides the necessary radio frequency (RF) signals to perform frequency down conversion, frequency up conversion, modulation, and demodulation.

IF filter 222 limits the bandwidth of the signals received from the down converter and passes the filtered signals to QPSK demodulator 224. IF filter 222 is coupled to QPSK demodulator 224. QPSK demodulator 224 recovers QPSK data from the filtered signals. QPSK demodulator 224 is used to separate the short range data from the long range data. In FIG. 2, short range data is shown coming out of the in-phase (I) data port, and the long range data is shown coming out of the quadrature-phase (Q) data port. Those skilled in the art will recognize that the present invention does not require the short range data to exit the I port nor does the long range data have to exit the Q port. Data processor 230 is coupled to QPSK demodulator 224 and obtains both long range data and short range data from QPSK demodulator 224. Those skilled in the art will recognize that data processor 230 may not be required to process short range data, if the satellite on which the receiver is located does not have a short range crosslink with another satellite. Those skilled in the art will also recognize that data processor 230 may not be required to process long range data, if the satellite on which the receiver is located does not have a long range crosslink with another satellite.

While FIG. 2 illustrates a particular arrangement for a receiver, those skilled in the art will understand that a different arrangement can be used. It should be understood that a receiver can assume any number of different configurations, with varying component combinations and performance levels. For example, a receiver could be shown with more or fewer amplifiers and filters or a multiple down conversion.

Figure 3:
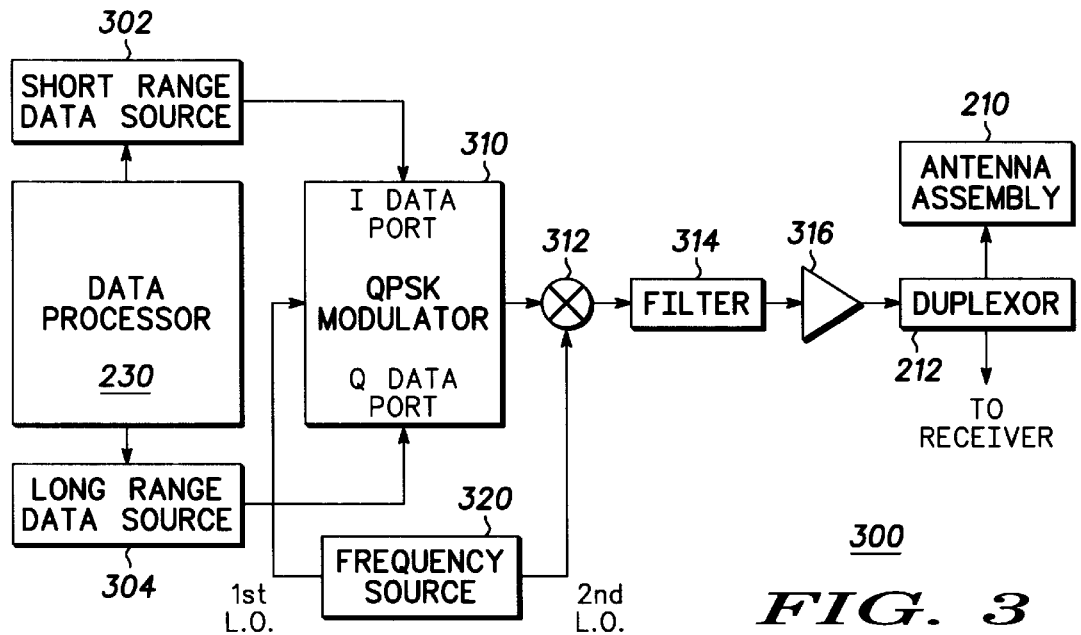
FIG. 3 shows a block diagram for a transmitter desirably used in a preferred embodiment of the present invention.

FIG. 3 shows a block diagram for a transmitter desirably used in a preferred embodiment of the present invention. Transmitter 300 comprises short range data source 302, long range data source 304, QPSK modulator 310, frequency source 320, up converter 312, filter 314, power amplifier 316, along with portions of duplexor 212 (FIG. 2) and antenna assembly 210 (FIG. 2). Transmitter 300 is used to transmit data from one satellite to other satellites. In a preferred embodiment, the other satellites are a long range satellite and a short range satellite.

Short range data source 302 receives short range data from data processor 230 (FIG. 2). Short range data source 302 is shown coupled to the "I" data port of QPSK modulator 310. Long range data source 304 receives long range data from data processor 230 (FIG. 2). Long range data source 304 is shown coupled to the "Q" data port of QPSK modulator 310. Those skilled in the art will recognize that the present invention does not require the short range data to enter the "I" port nor does the long range data have to enter the "Q" port.

QPSK modulator 310 is coupled to frequency source 320. QPSK modulator 310 obtains a first LO signal from frequency source 320. QPSK modulator 310 is also coupled to up converter 312. QPSK modulator 310 provides a modulated signal to up converter 312. Up converter 312 is also coupled to frequency source 320. Frequency source 320 provides up converter 312 with a signal (2nd LO) to use in the up-conversion process. Up converter 312 is also coupled to filter 314. Filter 314 is used to bandlimit the signals from up converter 312. Filter 314 bandlimits the signals into a frequency range that is suitable for transmitting. Filter 314 is coupled to power amplifier 316. Power amplifier 316 provides the necessary amplification of the transmitted signals. Power amplifier 316 is coupled to duplexor 212 (FIG. 2). Duplexor 212 channels the transmitted signals to antenna assembly 210 (FIG. 2) for transmission.

While FIG. 3 illustrates a particular arrangement for a transmitter, those skilled in the art will understand that a different arrangement can be used. It should be understood that a transmitter can assume any number of different configurations, with varying component combinations and performance levels. For example, a transmitter could be shown with more or fewer amplifiers and filters or a multiple up conversion.

Figure 4:
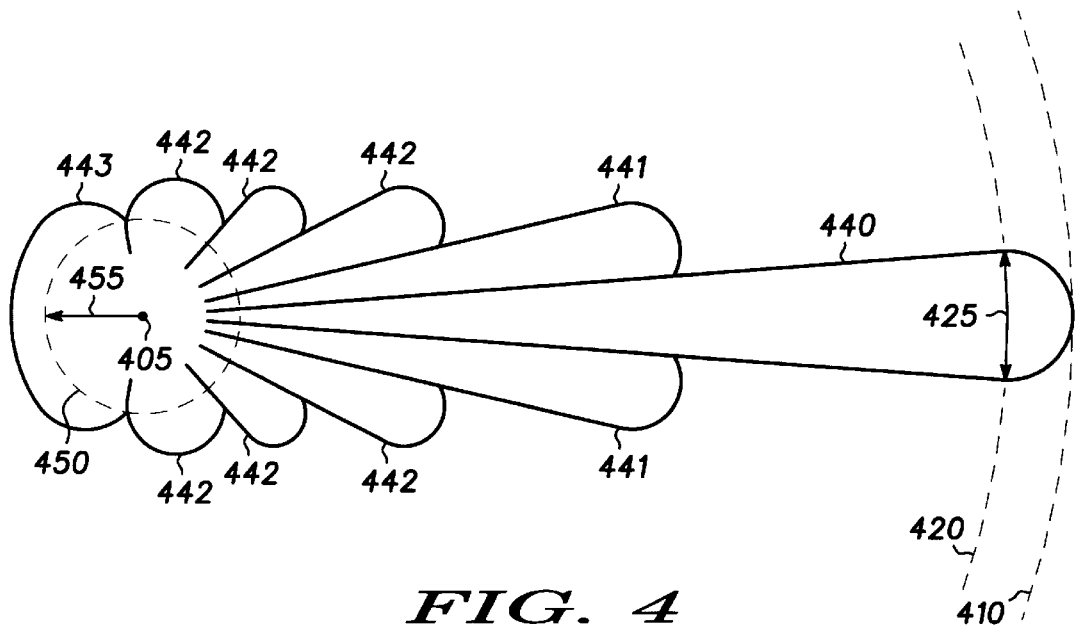
FIG. 4 shows an antenna and a representation of a radiation pattern associated with the antenna desirably used on the satellite, in accordance with a preferred embodiment of the present invention.

FIG. 4 shows an antenna and a representation of a radiation pattern associated with the antenna desirably used on the satellite, in accordance with a preferred embodiment of the present invention. Antenna 405 is shown having a radiation pattern which includes a main beam 440, first sidelobes 441, additional sidelobes 442, and a back scatter lobe 443. In addition, an arc 410 is used to represent the point of maximum power of the main beam. Another arc 420 defines two points on the main beam where the power is 3 dB down from the maximum power point. The difference between the two 3 dB points defines a beam width 425. A circle is used to represent the extent of the omni power region 450, and the radius of circle is the omni power radius 455.

For clarity, the antenna radiation pattern diagram of FIG. 4 illustrates the main lobe and sidelobes as being discrete, generally triangular shapes with some overlaps and some gaps. However, those skilled in the art will understand that in actual practice the radiation pattern projected by antennas of satellites can actually have shapes far different than a triangular shape. It should also be recognized that the antenna side lobes can distort the pattern, and some sidelobes can cover larger areas than other sidelobes.

In a preferred embodiment of the present invention, the extent of the main beam describes a distance which is shown in FIG. 4 as an arc. For example, a data element in a position table on-board satellites can be used to store a satellite location. In this embodiment, the extent of the main beam forms an arc, as shown in FIG. 4, having a center at the antenna's location and a radius defined by the direction of the main beam.

Figure 5:
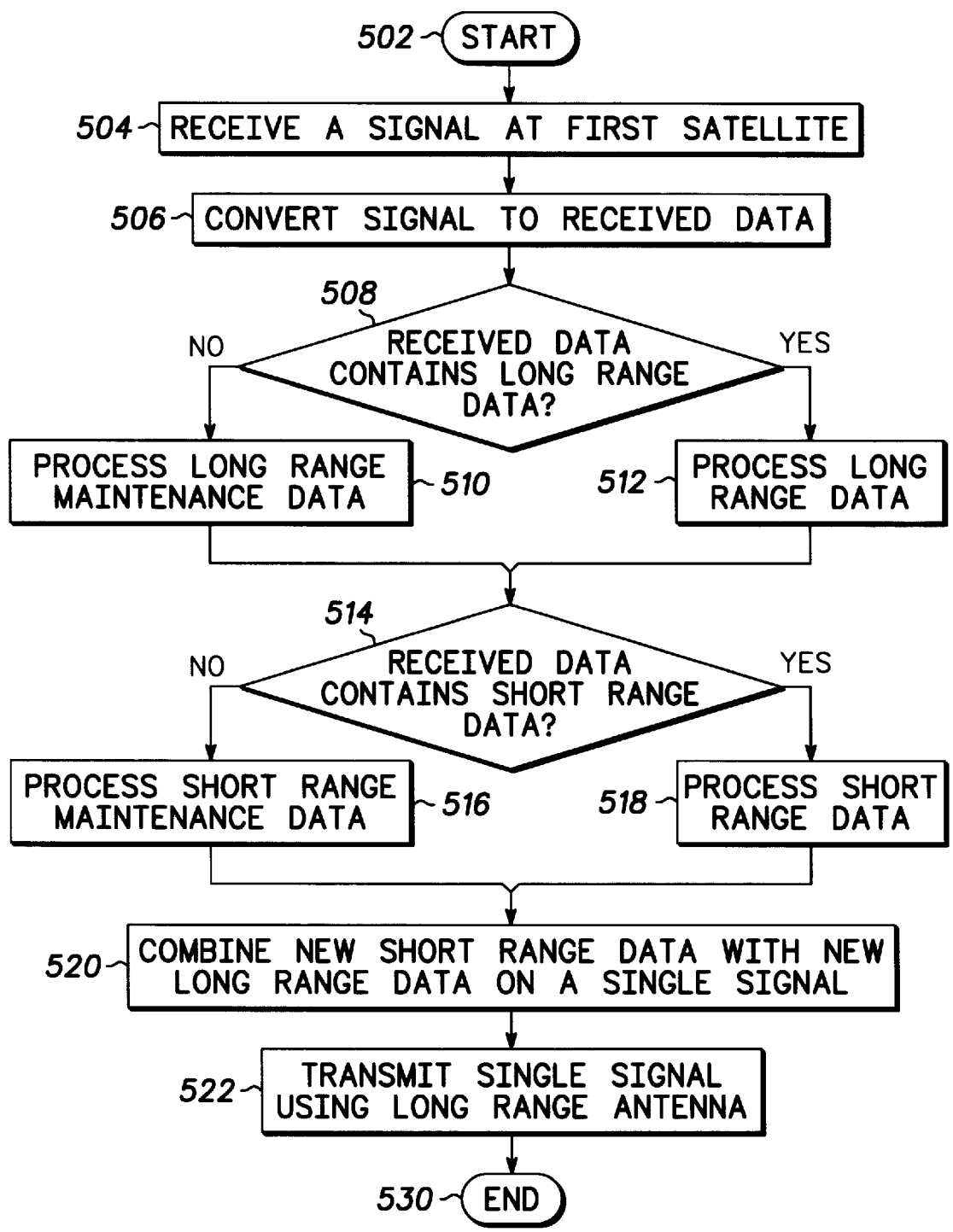
FIG. 5 is a flowchart of a method for operating a satellite in a satellite communication system, in accordance with a preferred embodiment of the present invention.

FIG. 5 is a flowchart of a method for operating a satellite in a satellite communication system, in accordance with a preferred embodiment of the present invention. Procedure 500 starts with step 502. In step 504, a signal is received at a satellite. In step 506, the received signal is converted to received data.

In step 508, a query is performed to determine if the received data contains long range data. For example, long range data can comprise location data for a particular long range satellite and new long range data which is data to be transmitted to that particular long range satellite. In this case, determining can include reading header information contained in data packets in the long range data. If the received data contains long range data, then step 512 is performed in which the long range data contained in the received data is processed. For example, processing can include storing, buffering, and reordering data packets.

When query task 508 determines that there is no long range data contained in the received data, then step 510 is performed to process long range maintenance data. As an example, this long range maintenance data could contain status information, synchronization information, or timing information. Long range maintenance data is transmitted as new long range data.

After new long range data is obtained from step 510 or from step 512, another query task 514 determines if the received data contains short range data. Short range data comprises location data for a particular short range satellite and new short range data which is data to be transmitted to that particular short range satellite. If the received data contains short range data, then step 518 is performed in which the short range data contained in the received data is processed. When query task 514 determines that there is no short range data contained in the signal, then step 516 is performed to process short range maintenance data. As an example, this short range maintenance data could contain status information, synchronization information, or timing information. Short range maintenance data is transmitted as new short range data.

After new short range data is obtained from step 516 or step 518, both the new long range data and the new short range data are combined on a single signal in step 520. In step 522, the single signal containing both the new long range and new short range data is transmitted using a long range antenna. Procedure 500 ends in step 530.

Figure 6:
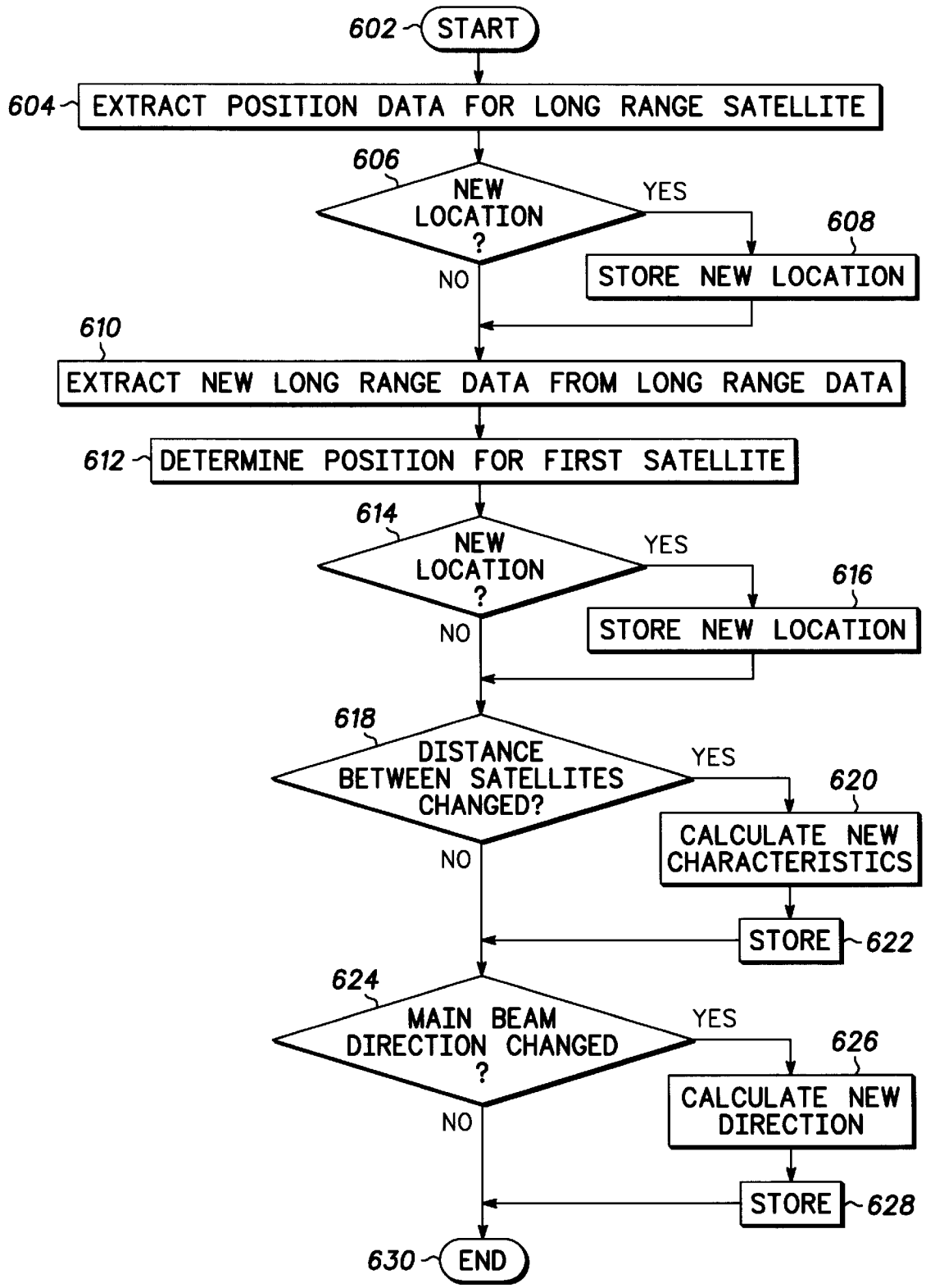
FIG. 6 is a flowchart of a method for processing long range data, desirably performed in accordance with a preferred embodiment of the present invention.

FIG. 6 is a flowchart of a method for processing long range data, desirably performed in accordance with a preferred embodiment of the present invention. Procedure 600 starts in step 602. In step 604, position data is extracted from the long range data. The position data describes the location for a particular long range satellite, and the long range data is unique to a particular long range satellite. In step 606, a query is performed comparing the location for this particular long range satellite with a stored value of a last reported location for this particular long range satellite. When the comparing step shows a difference, procedure 600 branches to step 608 in which the location for this particular long range satellite is stored as a new value of the last reported location for this particular long range satellite.

When the comparing step does not show a difference, step 610 is performed in which the new long range data is extracted from the long range data. New long range data contains data packets to be transmitted via a long range crosslink to a particular long range satellite. In step 612, the location of the first satellite is determined. In this step, the satellite determines its own position. For example, the first satellite determines the first satellite's location.

In step 614, another query is performed, this time comparing the location for the first satellite with a stored value of a last reported location for the first satellite. When the comparing step shows a difference, procedure 600 branches to step 616 in which the location for the first satellite is stored as a new value of the last reported location for the first satellite. When the comparing step does not show a difference, procedure 600 continues with step 618.

In step 618, another query is performed, this time determining if the distance between the two satellites has changed. The distance between the two satellites is determined using the difference between the location for the first satellite and the location for this particular long range satellite. The difference is compared to a predetermined threshold. When the comparing step shows a difference, procedure 600 branches to step 620 in which new long range beam power characteristics are calculated. In step 620, a new transmitting power for the long range crosslink to the particular long range satellite is calculated. Also in step 620, a new value for the omni power radius is calculated. The omni power radius defines the extent for omni power region 450 (FIG. 4). Omni power region 450 (FIG. 4) is the region within the antenna sidelobes in which short range link closure is guaranteed. In step 622, the new long range beam power characteristics are stored when new values are calculated.

In step 624, another query is performed, this time determining if the direction for the main beam of the crosslink device has changed. When the comparing step shows a difference which is greater than a predetermined value, procedure 600 branches to step 626 in which a new main beam direction is calculated based on the location for the first satellite and the location for the long range satellite. In step 628, the new main beam direction is stored, if the new main beam direction was calculated. Procedure 600 ends in step 630.

Figure 7:
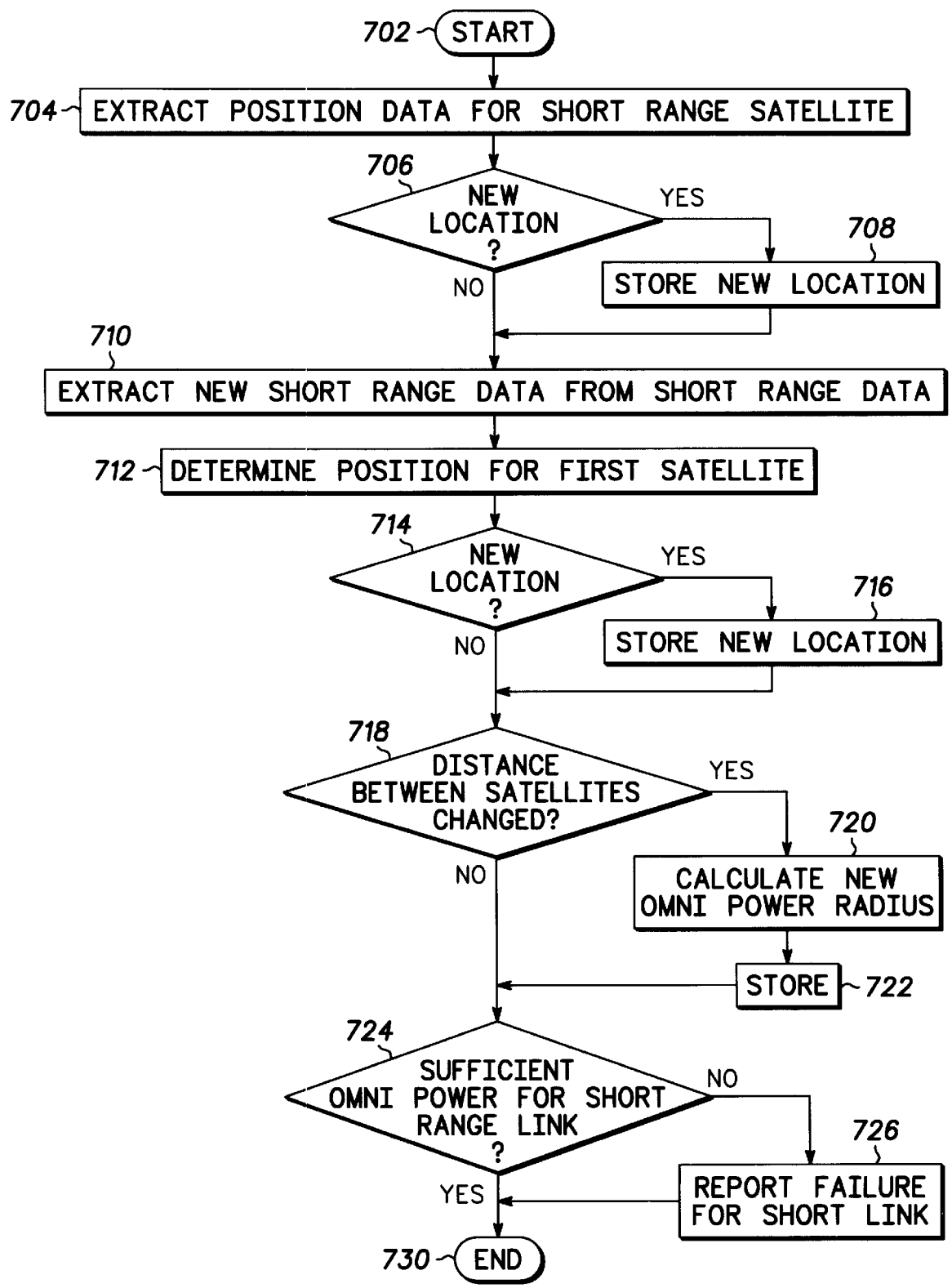
FIG. 7 is a flowchart of a method for processing short range data, desirably performed in accordance with a preferred embodiment of the present invention.

FIG. 7 is a flowchart of a method for processing short range data, desirably performed in accordance with a preferred embodiment of the present invention. Procedure 700 starts in step 702. In step 704, position data is extracted from the short range data. The position data describes the location for a particular short range satellite, and the short range data is unique to this particular short range satellite. In step 706, a query is performed comparing the location for this particular short range satellite with a stored value of a last reported location for this particular short range satellite. When the comparing step shows a difference, procedure 700 branches to step 708 in which the location for this particular short range satellite is stored as a new value of the last reported location for the short range satellite.

When the comparing step does not show a difference, step 710 is performed in which new short range data is extracted from the short range data. The new short range data contains data packets to be transmitted via a short range crosslink to the short range satellite. In step 712, the location of the first satellite is determined. In this step, the satellite determines its own position.

In step 714, another query is performed, this time comparing the location for the first satellite with a stored value of a last reported location for the first satellite. When the comparing step shows a difference, procedure 700 branches to step 716 in which the location for the first satellite is stored as a new value of the last reported location for the first satellite. When the comparing step does not show a difference, procedure 700 continues with step 718.

In step 718, another query is performed, determining this time if the distance between the two satellites has changed. The distance between the two satellites is determined using the difference between the location for the first satellite and the location for the short range satellite. The difference is compared to a predetermined threshold. When the comparing step shows a difference, procedure 700 branches to step 720 in which a new required omni power radius is calculated. The new required omni power radius is calculated based on the power required for the short range crosslink to the short range satellite. As stated above, the omni power radius defines the extent for the antenna sidelobes in which short range link closure is guaranteed. In step 722, the new required omni power radius is stored when a new value is calculated.

In step 724, another query is performed, this time determining if there is sufficient power in the omni power region to maintain the short range crosslink. When query step 724 is false, procedure 700 branches to step 726. In step 726, the failure is reported for the short range link. When query step 724 is true, procedure 700 branches to step 730 and ends.

There are a number of alternate embodiments which provide a number of choices for combining the short range data with the long range data on to a single signal so that the same transceiver can be used for both links. In a preferred embodiment, the single signal is the long range carrier signal which is transmitted as the main beam signal.

In a preferred embodiment, the combining technique used is a quadrature modulation technique in which the long range data is sent on the I channel and short range data is sent on the Q channel. This embodiment allows the long range data and the short range data to share a single high power saturated amplifier. In a preferred embodiment, a QPSK demodulator is used in the receiver to separate the short range data from the long range data. In a preferred embodiment, the same QPSK demodulator is used for each of the ISLs. This means that the receivers are the same in the satellites receiving the long range data as the receivers in the satellites receiving the short range data. In alternate embodiments, different receivers could be used for the long range data and the short range data. This design requires that satellites in different slots use different transmit frequencies sufficiently separated so that practical filters can extract the two signals.

In another alternate embodiment of the present invention, a different combining choice could be used in which a subcarrier is used to carry the short range ISL data. In this alternate embodiment, the subcarrier is first modulated by both the long range data and the short range data, and then it is modulated onto the long range carrier. Another related embodiment could implement this approach using two subcarriers, one for each ISL, and then up-converting the sum of these two subcarriers onto a final carrier. This embodiment allows nearly all of the transmitter hardware and some of the receiver hardware to be shared between the links. Like the quadrature modulation approach used in a preferred embodiment, the subcarrier approach used in these alternate embodiments requires distinct ISL transmitter frequencies for satellites in different slots. In the alternate embodiments which use the subcarrier approach, two different demodulators are required, but these demodulators could be simpler than the demodulator used in the quadrature modulator approach. It is also easier for the receiver to tell which signal is the long range and which is the short range using this alternate embodiment. Embodiments which use the subcarrier technique may require more high power amplifier (HPA) linearity than an embodiment which uses the quadrature modulation approach.

Another alternate embodiment is provided in which a pure two carrier frequency domain modulation (FDM) approach is used for combining the two ISL signals. This is a variation on the subcarrier approach. This alternate embodiment requires still better HPA linearity and requires about the same receiver complexity.

Alternate embodiments are also provided, in which code division multiple access (CDMA) modulation techniques can be used for combining the two ISLs onto a single carrier. For example, the short range and long range links could use different code patterns or different codes. Using different codes for the short range link and the long range link could simplify the design for the transmitter but could make the design of the receiver more complex. A CDMA design could avoid the need for different frequencies in different slots. Practically, the isolation requirements between the transmitter and receiver would probably still dictate the use of different frequencies in different slots.

Alternate embodiments are also provided, in which time division multiple access (TDMA) multiplexing techniques could be used for the long and short range ISLs. In these embodiments, the long range data and the short range data can occupy different time slots in a TDMA waveform. These alternate embodiments are particularly attractive for a packet system because signals are only sent when data is available. If the system has dynamic unbalanced data rate requirements between the two links, TDMA can automatically allocate power and bandwidth resources on a demand basis. In these TDMA embodiments, the receiver could use the packet header to decide whether a packet is a long range or a short range signal. In this way, the receiver could decide whether or not it should process the packet. Alternate embodiments employing this TDMA scheme could have certain disadvantages such as higher data rates and potentially more data delay than the other approaches. These alternate embodiments could also require the use of two frequencies unless a coordination protocol is applied between satellites in different slots.

In a preferred embodiment, the separation between the long range and short range satellites is such that even if a short range satellite were to get into the main beam, the short range satellite would not attenuate the signal enough to cause the link to be broken. In addition, short range satellites and long range satellites contain protection devices which limit the amount of RF energy that is allowed to pass to the more sensitive parts of the system such as the low noise amplifier (LNA). It this way, a satellite which passes into the main beam is protected from the higher than expected levels of RF energy.

In a preferred embodiment, satellite communications system 100 has current knowledge of the satellites' orbital paths for the satellites of both constellations. Satellite communication system 100 predicts when interference can occur and takes suitable measures to avoid the interference before the interference occurs, such as switching to a different satellite. This is the better approach, because interference may be avoided without affecting the system user.

The odds of interference occurring between satellites of different constellations can be calculated, because the positions of the satellites of each constellation at any time can be calculated, using known techniques.

The present invention has been described above with reference to a preferred embodiment and many alternate embodiments. Any one of the combining approaches detailed in a preferred embodiment or the alternate embodiments is workable. The best embodiment to use for a particular application will depend on a number of system factors.

The present invention has been described above with reference to a preferred embodiment. However, those skilled in the art will recognize that changes and modifications can be made in this embodiment without departing from the scope of the present invention. For example, while various embodiments have been described in terms of using a specific number of satellites and a specific antenna pattern, other descriptions or methods can also be employed. In addition, the present invention need not be restricted to use only in connection with a satellite-based communication system. Those skilled in the art may easily adapt the teaching of the present invention to any satellite-based or land-based communication system which transmits signals from transmitters to receivers located at different distances from the transmitters. Accordingly, these and other changes and modifications which are obvious to those skilled in the art are intended to be included within the scope of the present invention.

What is claimed is:

1. A method of operating a satellite of a plurality of satellites comprising the following steps, not necessarily in the order shown:
   (a) receiving, at a first satellite, a signal;
   (b) converting said signal into received data;
   (c) determining if said received data contains long range data;
   (d) processing said long range data when step (c) is true, wherein some of said long range data is processed into new long range data for a particular long range satellite;
   (e) processing long range maintenance data when step (c) is false, wherein some of said long range maintenance data is processed into said new long range data;
   (f) determining if said received data contains short range data;
   (g) processing said short range data when step (f) is true, wherein some of said short range data is processed into new short range data for a particular short range satellite;
   (h) processing short range maintenance data when step (f) is false, wherein some of said short range maintenance data is processed into said new short range data;
   (i) combining said new long range data and said new short range data onto a single signal; and
   (j) transmitting said single signal using a single antenna.

2. The method as claimed in claim 1 wherein step (b) further comprises the step of:
   using a receiver with a QPSK demodulator to convert said signal into said received data, wherein said received data is obtained from an in-phase port and a quadrature-phase port.

3. The method as claimed in claim 2, wherein said method further comprises the steps of:
   using said QPSK demodulator to obtain said long range data, wherein said long range data is obtained from said in-phase port when said short range data is obtained from said quadrature-phase port; and
   using said QPSK demodulator to obtain said short range data, wherein said short range data is obtained from said in-phase port when said long range data is obtained from said quadrature-phase port.

4. The method as claimed in claim 1 wherein step (b) further comprises the step of:
   using a receiver with a CDMA demodulator to obtain said received data.

5. The method as claimed in claim 4 wherein said method further comprises the steps of:
   using said CDMA demodulator to obtain said long range data, wherein said long range data is obtained from a first code; and
   using said CDMA demodulator to obtain said short range data, wherein said short range data is obtained from a second code.

6. The method as claimed in claim 1 wherein step (b) further comprises the step of:
   using a receiver with a frequency domain demodulator to obtain said received data.

7. The method as claimed in claim 6 wherein said method further comprises the steps of:
   using said frequency domain demodulator to obtain said long range data, wherein said long range data is obtained from a first subcarrier; and
   using said frequency domain demodulator to obtain said short range data, wherein said short range data is obtained from a second subcarrier.

8. The method as claimed in claim 1 wherein step (b) further comprises the step of:
   using a receiver with a TDMA demodulator to obtain said received data.

9. The method as claimed in claim 8 wherein said method further comprises the steps of:
   using said TDMA demodulator to obtain said long range data, wherein said long range data is obtained from a first set of time slots in a TDMA waveform; and
   using said TDMA demodulator to obtain said short range data, wherein said short range data is obtained from a second set of time slots in a TDMA waveform.

10. The method as claimed in claim 1 wherein step (i) further comprises the step of:
    using a transmitter with a QPSK modulator to combine said long range data and said short range data, wherein said long range data is used as in-phase data and said short range data is used as quadrature-phase data.

11. The method as claimed in claim 1 wherein step (i) further comprises the step of:
    using a transmitter with a QPSK modulator to combine said long range data and said short range data, wherein said short range data is used as in-phase data and said long range data is used as quadrature-phase data.

12. The method as claimed in claim 1 wherein step (i) further comprises the step of:
    using a transmitter with a CDMA modulator to combine said long range data and said short range data, wherein said long range data uses one code and said short range data uses another code.

13. The method as claimed in claim 1 wherein step (i) step further comprises the steps of:
    modulating a subcarrier signal using said long range data;
    combining said subcarrier signal and said short range data into a new modulation signal; and
    modulating a carrier signal using said new modulation signal.

14. The method as claimed in claim 1 wherein step (i) further comprises the steps of:
   modulating a subcarrier signal using said short range data;
   combining said subcarrier signal and said long range data into a new modulation signal; and
   modulating a carrier signal using said new modulation signal.

15. The method as claimed in claim 1 wherein step (i) further comprises the steps of:
   modulating a first subcarrier signal using said long range data;
   modulating a second subcarrier signal using said short range data; and
   modulating a carrier signal using said first subcarrier signal and said second subcarrier signal.

16. The method as claimed in claim 1 wherein step (i) further comprises the steps of:
   allocating a first set of time slots in a TDMA waveform for said long range data;
   allocating a second set of time slots in said TDMA waveform for said short range data; and
   modulating a carrier signal using said TDMA waveform.

17. The method as claimed in claim 1 wherein step (d) further comprises the following steps, not necessarily in the order shown:
   (d1) extracting position data from said long range data, wherein said position data describes a location for said particular long range satellite;
   (d2) comparing said location for said particular long range satellite with a stored value of a last reported location for said particular long range satellite;
   (d3) storing said location for said particular long range satellite as a new value of said last reported location for said particular long range satellite when step (d2) shows a difference;
   (d4) extracting said new long range data from said long range data, wherein said new long range data contains data packets to be transmitted via a long range crosslink to said particular long range satellite;
   (d5) determining, at said first satellite, a location for said first satellite;
   (d6) comparing said location for said first satellite with a stored value of a last reported location for said first satellite;
   (d7) storing said location for said first satellite as a new value of said last reported location for said first satellite when said step (d6) shows a difference;
   (d8) calculating a new transmitting power for said long range crosslink to said particular long range satellite when said difference between said location for said first satellite and said location for said particular long range satellite exceeds a predetermined threshold;
   (d9) storing said new transmitting power, if said new transmitting power was calculated;
   (d10) calculating a new main beam direction for said long range crosslink to said particular long range satellite when said location for said first satellite and said location for said particular long range satellite have changed more than a predetermined value; and
   (d11) storing said new main beam direction, if said new main beam direction was calculated.

18. The method as claimed in claim 1 wherein step (g) further comprises the following steps, not necessarily in the order shown:
   (g1) extracting position data from said short range data, said position data describing a location for said particular short range satellite;
   (g2) comparing said location for said particular short range satellite with a stored value of a last reported location for said particular short range satellite;
   (g3) storing said location for said particular short range satellite as a new value of said last reported location for said particular short range satellite when step (g2) shows a difference;
   (g4) extracting new short range data from said short range data, wherein said new short range data contains data packets to be transmitted via a short range crosslink to said particular short range satellite;
   (g5) determining, at said first satellite, a location for said first satellite;
   (g6) comparing said location for said first satellite with a stored value of a last reported location for said first satellite;
   (g7) storing said location for said first satellite as a new value of said last reported location for said first satellite when step (g6) shows a difference;
   (g8) calculating a new required omni power for said short range crosslink to said particular short range satellite when said difference between said location for said first satellite and said location for said particular short range satellite exceeds a predetermined threshold;
   (g9) storing said new required omni power, if said new required omni power was calculated;
   (g10) determining if omni power is sufficient for said short range crosslink to said particular short range satellite; and
   (g11) reporting a failure for said short range link when step (g10) is false.

19. The method of operating a satellite in a satellite system comprising the steps of:
   transmitting a first set of signals using a crosslink device via a long range crosslink with a first satellite in said satellite system which is located far from said satellite;
   using said crosslink device to transmit a second set of signals via a short range crosslink with a second satellite which is located near to said satellite, wherein said first set of signals and said second set of signals are combined into a single transmitted signal, said long range crosslink being established using a main beam in a radiation pattern of said crosslink device, and said short range crosslink being established using a sidelobe in the radiation pattern of said crosslink device;
   receiving a third set of signals using said crosslink device via long range crosslinks with a third number of satellites in said system which are located far from said satellite; and
   using said crosslink device to receive a fourth set of signals via short range crosslinks with a fourth number of satellites which are located near to said satellite, wherein said third set of signals and said fourth set of signals are obtained from a single received signal.

20. A satellite in a communication system comprising:
   a crosslink device which allows said satellite to communicate with short range satellites in said communication system which are located close to said satellite and which also allows said satellite to communicate with long range satellites in said communication system which are located far from said satellite;

a transmitter coupled to said crosslink device which allows said satellite to transmit a first set of signals to a first number of said long range satellites and which also allows said satellite to transmit a second set of signals to a second number of said short range satellites substantially at the same time; and a receiver coupled to said crosslink device which allows said satellite to receive a third set of signals from a third number of said long range satellites and which also allows said satellite to receive a fourth set of signals from a fourth number of said short range satellites, wherein said transmitter comprises:

a data processor for processing short range data and long range data;

a quadrature phase shift keyed (QPSK) modulator coupled to said data processor for modulating said short range data into said third set of signals and for modulating said long range data into said fourth set of signals;

an up converter coupled to said QPSK modulator for up converting said third and fourth sets of signals;

a filter coupled to said up converter for filtering said third and fourth sets of signals;

a power amplifier coupled to said filter for amplifying said third and fourth sets of signals; and duplexor coupled to said crosslink device and to said power amplifier for separating said first set of signals and said second set of signals from said third set of signals and said fourth set of signals, respectively.

21. The satellite as claimed in claim 20, wherein said crosslink device is provided by a laser signal means.

22. The satellite as claimed in claim 20, wherein said crosslink device is provided by an RF signal means.

23. The satellite as claimed in claim 20, wherein said crosslink device is provided by an RF antenna means.

24. The satellite as claimed in claim 20, wherein said receiver further comprises:

an antenna assembly for receiving said third set of signals and for receiving said fourth set of signals;

a duplexor coupled to said antenna assembly for separating said first set of signals and said second set of signals from said third set of signals and said fourth set of signals;

a filter coupled to said duplexor for filtering said third set of signals and said fourth set of signals;

an amplifier coupled to said filter for amplifying said third set of signals and said fourth set of signals;

a down converter coupled to said amplifier for down converting said third set of signals and said fourth set of signals;

an intermediate frequency (IF) filter couple to said down converter for filtering said third set of signals and said fourth set of signals;

a quadrature phase shift keyed (QPSK) demodulator coupled to said IF filter for demodulating said third set of signals into long range data and for demodulating said fourth set of signals into short range data;

a data processor coupled to said QPSK demodulator for processing said short range data and said long range data; and a frequency source coupled to said down converter and to said QPSK demodulator.

* * * * *